United States Patent [19]

Faust et al.

[11] Patent Number: 4,695,095
[45] Date of Patent: Sep. 22, 1987

[54] ARRANGEMENT FOR SECURING THE END POSITION OF A GUIDED SUPPORT ROD OF A HEADREST

[75] Inventors: Eberhard Faust, Stuttgart; Kurt Niethammer, Jettingen; Ludwig Hammer, Nagold, all of Fed. Rep. of Germany

[73] Assignee: Daimler-Benz Aktiengesellschaft, Fed. Rep. of Germany

[21] Appl. No.: 784,108

[22] Filed: Oct. 4, 1985

[30] Foreign Application Priority Data

Oct. 5, 1984 [DE] Fed. Rep. of Germany ....... 3436541

[51] Int. Cl.$^4$ ............................................... A47C 7/36
[52] U.S. Cl. ..................................... 297/410; 297/391
[58] Field of Search ................ 297/410, 391; 403/109, 403/325, 327; 248/408, 409

[56] References Cited

U.S. PATENT DOCUMENTS

| 507,044 | 10/1893 | Schmidt | 248/409 |
|---|---|---|---|
| 2,730,687 | 1/1956 | Modrey | 403/325 |
| 3,542,429 | 11/1970 | Inoue | 297/410 |
| 3,544,162 | 12/1970 | Uchiyamada et al. | 297/410 |
| 3,563,602 | 2/1971 | Ohta | 297/410 |
| 3,692,356 | 9/1972 | Mertens | 297/410 |
| 3,886,962 | 6/1975 | Diamontis | 403/327 |
| 4,483,565 | 11/1984 | Terui et al. | 297/410 |

FOREIGN PATENT DOCUMENTS 2138078  2/1973  Fed. Rep. of Germany .

Primary Examiner—Francis K. Zugel

[57] ABSTRACT

A vehicle passenger, or the like headrest equipped with an arrangement to secure an end position is disclosed. In order to accommodate removal of the head rest with both hands after the cancelling of a locking effect, a remote control is provided in the form of an operating rod extending approximately in axial direction of a headrest support rod. When the operating rod is operated, the catch is guided into a secured disengaged position which, when the support rod is pushed in again, by the effect of the support rod, is cancelled again so that safety is not sacrificed.

7 Claims, 3 Drawing Figures

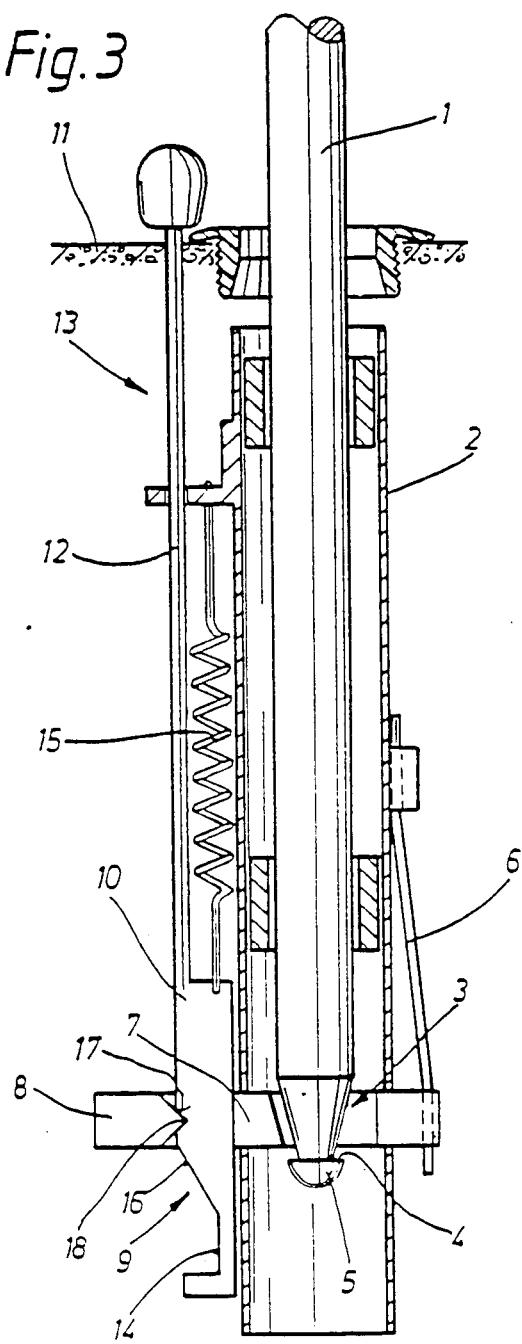

ARRANGEMENT FOR SECURING THE END POSITION OF A GUIDED SUPPORT ROD OF A HEADREST

BACKGROUND AND SUMMARY OF THE INVENTION

This application is related to commonly assigned application Ser. No. 784,051, filed on even date herewith and based on German Priority Application P 34 36 541.9, filed in Germany on Oct. 5, 1984.

The present invention relates to an improved apparatus for releaseably holding a vehicle passenger head rest, at a vehicle seat back or the like. Preferred embodiments of the invention relate to an arrangement for securing the end position of a guided support rod of a headrest, wherein a recess is provided at the free end of the support rod into which a spring-loaded catch engages when the maximum pull-out length of the headrest is reached, this catch being releasable via a remote control device extending from the upper side of the backrest.

A securing arrangement for the end position that is releasable in this way is known from DE-OS 21 38 078. In that case, the remote control device is comprised of a strap that is applied to the spring. However, the released position is only maintained as long as the strap is pulled, so that only one hand is available for the pulling-out of the headrest. This restriction makes the headrest removal process difficult.

It is an objective of the invention to create a possibility of being able to remove the headrest with both hands when the catch is released without sacrificing safety. Thus, the release means remains in a released position without requiring the operator to manually exert a force on the said release means in the preferred embodiments of the present invention.

In an advantageous development of the preferred embodiments of the invention, an operating rod of the locking release means tapers off into a slider equipped with a control path, and a catch with a feeler portion that is assigned to the control path in such a way that when the maximum pull-out length of the headrest is reached, the feeler portion comes to rest against a section of the control path that is close to the support rod, and when the spring-loaded operating rod is pressed down, the feeler portion moves up an inclined surface of the control path and engages into a notch that is spaced further from the support rod, such that the catch is lifted far enough out from the free end of the support rod that the recess and head sections of the support rod can be moved past the catch.

A further advantageous development of the invention is that by means of the design of the support rod and catch, when the headrest is reinserted after removal, the support rod clears the catch until the inclined recess passes the catch, wherein the catch engages the surface of the control rod and subsequently disengages the remote control release means.

In certain preferred embodiments, the operating rod of the catch release mechanism is spring biased toward a position permitting the catch to lock the support rod at its desired extreme in use end position with reinsertion of the supported operating to automatically reset the catch to serve its locking function.

Other objects, advantages and novel features of the present invention will become apparent from the following detailed description of the invention when considered in conjunction with the accompanying drawings.

BRIEF DESCRIPTION OF THE DRAWINGS

FIG. 3 is a view similar to FIGS. 1 and 2, but showing the operational parts in a position corresponding to release of the end securing mechanism to permit removal of the headrest, with the operating rod pushed in and the slider locked.

DETAILED DESCRIPTION OF THE DRAWINGS

Figure 1:
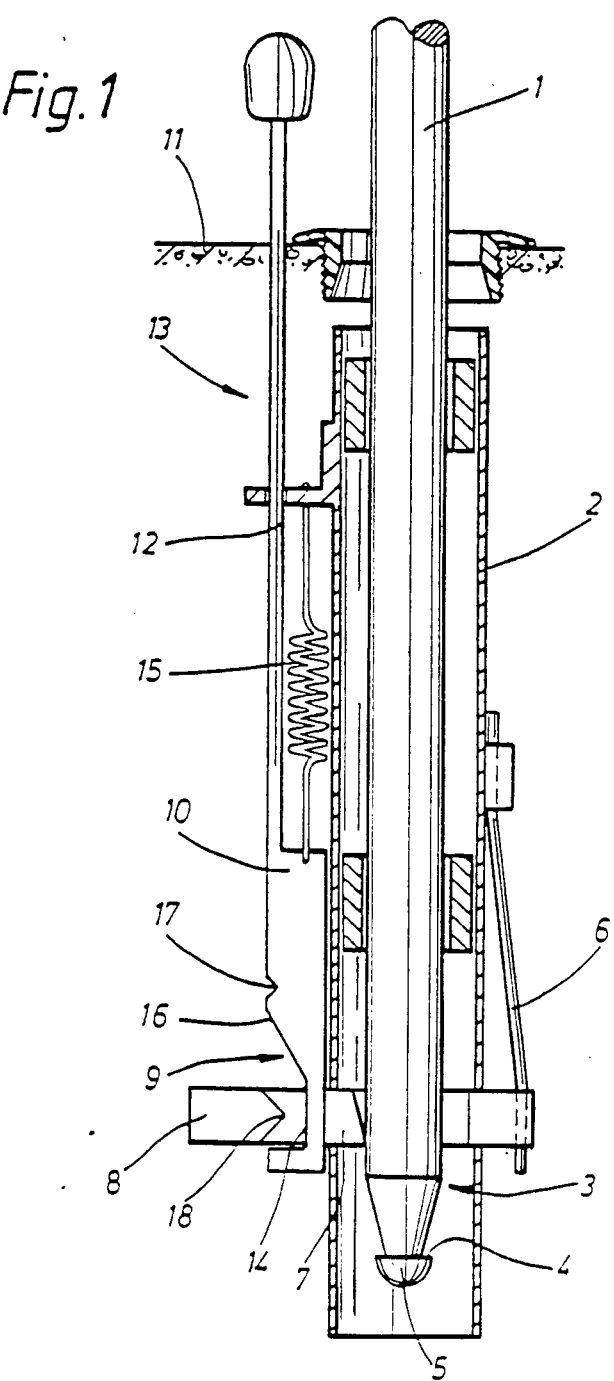
FIG. 1 is a partial sectional schematic view showing a guided support rod having an arrangement for securing the end position at the end of the sliding phase, constructed in accordance with a preferred embodiment of the invention.

A support rod 1 of a headrest that is not shown in detail can be continuously vertically adjustably slid in a guide 2, as shown in FIG. 1. The support rod 1 has a recess 4 and at its free end 3, which ends in a head 5 having a diameter that is smaller than that of the support rod 1.

A catch 7 that is loaded by a spring 6, during the sliding phase of the support rod 1—as shown in FIG. 1—supports itself on the shaft of the support rod 1. According to FIG. 2, when the maximum extension length of the headrest is reached, the catch moves into a recess 4 located at the free end 3 of the support rod. When the support rod 1 is moved further up, the catch places itself against the head 5 in a locking manner.

A feeler portion 8 is connected with the catch 7, the feeler portion 8 being assigned to a control path 9 of a slider 10. This slider 10, together with an operating rod 12 that forms its extension and is guided approximately in an axial direction of the support rod 1 to the indicated upper side 11 of the backrest, forms a remote control 13.

Figure 2:
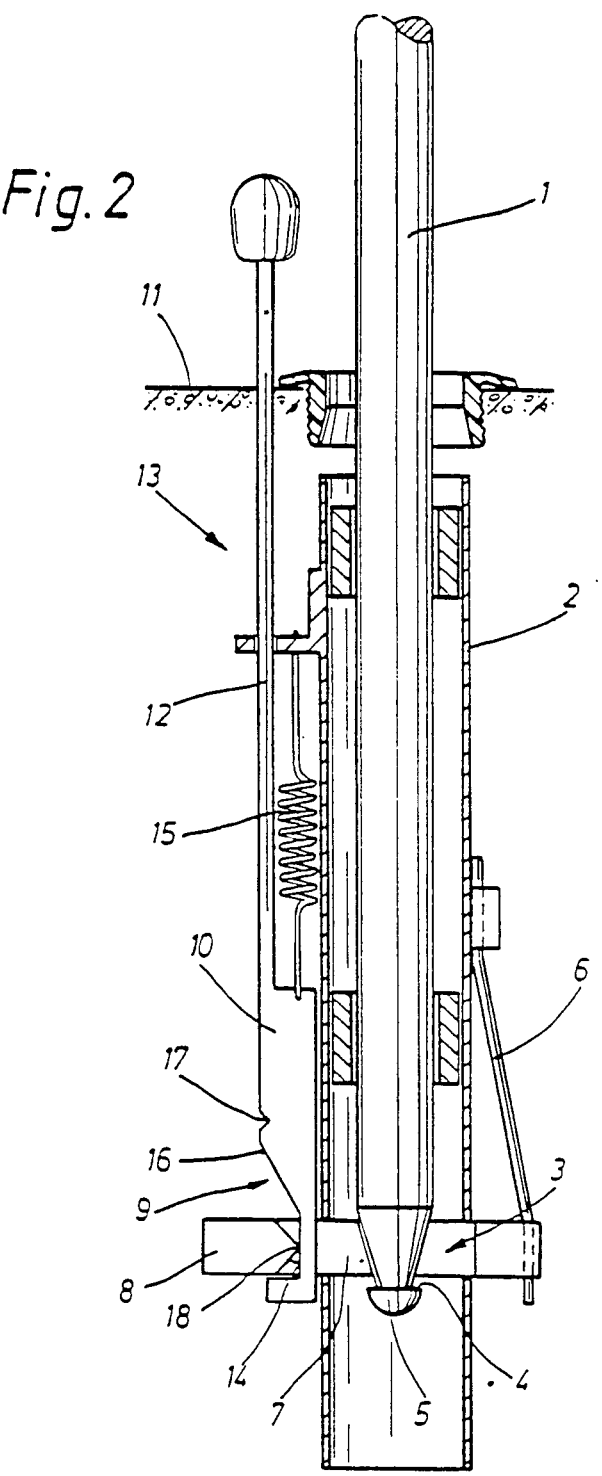
FIG. 2 is a view similar to FIG. 1, but showing the operational parts in a position corresponding to pulling out of the support rod shortly before engagement of the end position securing mechanism.

When the catch 7 moves into the recess 4, as shown in FIG. 2, the feeler portion 8 at the same time moves in the direction of the control path 9. When the catching position is reached, the feeler portion comes to rest against a section 14 of the control path 9 that is close to the support rod. This feeler portion 8 connected with the latch 7 biased by a spring 6, which engages the recess 4 of the head 5 of the support rod 1, forms the locking mechanism. When the operating rod 12 is pressed downward against the force of a spring 15, the feeler portion 8 moves upward on an inclined surface 16 connected to the section 14 and engages in a notch 17 on the remote control 13. In this position, which is shown in FIG. 3, the catch 7 just barely releases the head 5 so that the headrest can be pulled off with both hands. The release mechanism comprises the spring 15 biasing an operating rod 12 having a slider 10 with a notch 17 and a control path 9 including an inclined surface 16 and a section 14.

When the support rod 1 is reinserted, after the passing of the head 5, the catch 7 comes to rest at the sloping section of the recess 4 which has a larger diameter than the head 5 and which guides the tip 18 of the feeler portion 8 out of the ntoch 17, whereupon the spring 15 is unloaded and the slider 10 is returned into its starting position shown in FIG. 1. This sloping section of the recess 4 and the catch 7 form the triggering mechanism whereby when the sloping section displaces the catch 7, the tip 18 is pushed out of the notch 17 and the starting (locking) position is attained.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. An arrangement for securing the position of a support rod means for a vehicle headrest, comprising:
   locking means for preventing an unintentional manual removal of said headrest by an operator,
   release means for disengaging said locking means to permit manual removal of said headrest, said release means being configured such that an external manual force is unnecessary to maintain said locking means in its disengaged state whereby said headrest may be removed with both hands by the operator using a minimal force, and
   a triggering means for automatically resetting the release means to its inoperative position upon reinsertion of said headrest support rod means.

2. An arrangement according to claim 1, wherein said support rod means is adjustably moveable in a longitudinal direction, and wherein said locking means includes a spring-loaded catch means which abuttingly engages a counter abutment means at said support rod means.

3. An arrangement according to claim 1, wherein said release means includes manually displaceable means for accomodating disengagement of said locking means.

4. An arrangement according to claim 3, wherein said locking means includes catch means abuttingly engageable with a counter abutment means at said support rod means, and
   wherein said release means includes resilient means biasing said manually displaceable means in a direction corresponding to engagement of said locking means, said manually displaceable means being operable in response to movement thereof against the force of the resilient means to move the catch means to a non-locking position with respect to the support rod means.

5. An arrangement according to claim 1, wherein said locking means includes catch means abuttingly engageable with counter detent means at said support rod means,
   wherein said triggering means comprises abutment surfaces at the support rod means engageable with the catch means, such that upon reinsertion movement of the support rod means, longitudinally past said catch means, the effective cross-sectional dimension of said support rod means gradually increases along the abutment surfaces to a point where said abutment surfaces forceably engage and laterally displace said catch means, disengaging a feeler portion from a notch on the release means, whereby the release means is reset to its original, unloaded state.

6. An arrangement according to claim 1, wherein said locking means includes a recess at the free end of the support rod means engageable with a spring loaded catch means when the maximum extension of the headrest is reached, and wherein the releasable means includes means operable movable in the axial direction of the support rod means, so as to abuttingly movably engage said catch in a secured disengaged position away from the recess permitting removal of said headrest.

7. An arrangement according to claim 6, wherein the release means comprises an operating rod which ends in a slider equipped with a control path, said catch means being disposed on a member including a feeler portion means, which, during movement of the slider, travels along the control path in such a way that when the maximum extension of the headrest is reached, said feeler portion comes to rest at a section of the control path that is close to the support rod means, whereby said catch means engages in the recess of the support control rod means, and wherein the operating rod is spring-loaded so that when it is pushed in a direction to disengage the locking means the feeler portion moves along an inclined surface of the control path to a position in engagement in a notch that is disposed away from the support rod, whereby said catch means no longer engages in the recess of the support rod means and said support rod means can be moved past said catch means.

* * * * *